United States Patent
Reuter et al.

(10) Patent No.: US 12,536,580 B2
(45) Date of Patent: Jan. 27, 2026

(54) SYSTEM FOR PROVIDING DIGITAL MAP CORRECTIONS

(71) Applicant: Target Brands, Inc., Minneapolis, MN (US)

(72) Inventors: Brandon Reuter, Minneapolis, MN (US); Eric Runquist, Minneapolis, MN (US); Gagan Mahajan, Minneapolis, MN (US); Jeffrey A. Tate, Minneapolis, MN (US); Vidya Attivilli, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 422 days.

(21) Appl. No.: 18/135,909

(22) Filed: Apr. 18, 2023

(65) Prior Publication Data

US 2024/0354832 A1   Oct. 24, 2024

(51) Int. Cl.
  *G06Q 30/00*  (2023.01)
  *G06Q 30/0601* (2023.01)

(52) U.S. Cl.
  CPC ............... *G06Q 30/0639* (2013.01)

(58) Field of Classification Search
  CPC ............ G06Q 30/0601–0645; G06Q 30/08
  See application file for complete search history.

(56) References Cited

U.S. PATENT DOCUMENTS

| | | |
|---|---|---|
| 8,407,003 B2 | 3/2013 | Geelen et al. |
| 2005/0021561 A1 | 1/2005 | Noonan |
| 2007/0150186 A1 | 6/2007 | Ingulsrud |
| 2009/0070031 A1 | 3/2009 | Ginsberg |
| 2009/0292464 A1 | 11/2009 | Fuchs et al. |
| 2011/0112762 A1 | 5/2011 | Gruijters et al. |
| 2012/0108259 A1 | 5/2012 | Weiss |
| 2014/0304123 A1 | 10/2014 | Schwartz |
| 2015/0006279 A1 | 1/2015 | Khann et al. |
| 2015/0088703 A1 | 3/2015 | Yan |
| 2015/0088937 A1 | 3/2015 | Lons et al. |
| 2015/0169597 A1 | 6/2015 | Edge et al. |
| 2015/0262120 A1 | 9/2015 | Kulig et al. |
| 2017/0228688 A1* | 8/2017 | Bourlon ............ G06Q 10/087 |
| 2018/0005309 A1 | 1/2018 | Croy et al. |
| 2018/0293543 A1 | 10/2018 | Tiwari et al. |

(Continued)

OTHER PUBLICATIONS

Schafer et al., Automatic Generation of Topological Indoor Maps for Real-Time Map-Based Localization and Tracking, 2011, Institute of Real-Time Computer Systems, 8 pages (Year: 2011).*

*Primary Examiner* — Jeffrey A. Smith
*Assistant Examiner* — Lindsey B Smith
(74) *Attorney, Agent, or Firm* — Barnes & Thornburg LLP

(57) ABSTRACT

In some implementations, a method performed by data processing apparatuses includes receiving original map data for a digital map of a physical space, receiving item location data that represents item scans that have been performed by mobile devices in the physical space, and determining that a discrepancy exists for a fixture in the physical space, based at least in part on a comparison of the original map data and the item location data. In response to determining that the discrepancy exists, map data is generated that corrects the discrepancy for the fixture, and a corrected digital map is provided that replaces the original map data with the corrected map data.

14 Claims, 10 Drawing Sheets

(56) References Cited

U.S. PATENT DOCUMENTS

2020/0074371 A1    3/2020  Bogolea
2020/0096349 A1*   3/2020  Black .................... G01C 21/383
2020/0314598 A1*  10/2020  Lissick .................. G01C 21/38

* cited by examiner

SYSTEM FOR PROVIDING DIGITAL MAP CORRECTIONS

TECHNICAL FIELD

This specification generally relates to providing corrections for digital maps of physical spaces, such as retail stores.

BACKGROUND

Digital maps of indoor and outdoor spaces have been used to help guide users as they move around those spaces. For example, digital maps have been generated and presented in applications that permit a user to zoom and scroll around the map, and in some instances, to view the user's current location superimposed at an appropriate location on the map. Icons that identify places of interest for a user (such as stores, restaurants, and parks) can also be depicted on maps.

Computer-aided design (CAD) tools may be used for developing and maintaining a map that represents a physical space. When changes occur to the physical space (e.g., buildings or roads are built or demolished), corresponding changes are generally made to the map using the computer-aided design tools. For example, the aisles, shelves, and overall physical layout in a retail store can be digitally mapped out in a CAD file using CAD tools. When the physical layout of the retail store changes (such as aisles being rearranged, added, removed, or otherwise changed), the CAD tool can be used to update the map of the retail store to reflect those changes in the CAD file.

SUMMARY

This document generally describes computer systems, processes, program products, and devices for providing corrections for digital maps of physical spaces (e.g., retail stores, warehouses, or other facilities). Digital maps can be generated, maintained, and provided for a physical space, for example, to facilitate organization of the space, to facilitate location identification for various fixtures (e.g., shelves, racks, workstations, etc.), items (e.g., products), and other objects in the space, and to facilitate navigation throughout the space. Planogram data may also be associated with a digital map, in which labels can be assigned to mapped areas and elements to help identify various sections, departments, fixtures, and items. The digital map (e.g., including the planogram data) can be provided to workers and other users (e.g., on a computing device display) to help with tasks such as item location, inventory assessment, planning, remodeling, and other tasks. However, inaccurate map and/or planogram data can hinder such tasks. In general, generating and maintaining a digital map, and ensuring that the digital map, its planogram data, and a physical space are accurate and aligned, can be challenging. For example, for changes made to a physical space to be accurately reflected in a digital map of the space, the changes need to be communicated to the correct design personnel, who would then manually use digital design tools to update the corresponding map and/or planogram data. However, such a process can have many pitfalls, including system inefficiencies, timeliness, and human error. This document describes techniques, systems, processes, and devices for automatically detecting possible map discrepancies and for quickly correcting the discrepancies so that digital map accuracy can be improved. The techniques can provide, for example, improved digital map generation processes that generate digital maps that more accurately reflect the current state of a physical space.

Such improved digital map generation processes can be performed using any of a variety of appropriate data sources, as described in greater detail below. For example, location information for users and other people moving throughout a physical space can be used to infer the location of objects within the physical space. For example, location-based event information can be used to determine where physical objects are located (e.g., product scans and/or other actions that are associated with locations within a physical space can be used to locate physical objects within the physical space). Such location information can be combined with, for example, preexisting map data to improve upon and update the preexisting map data. For example, an existing map of a physical space can be combined with location information from users and events to improve upon and update the existing map. Additional and/or alternative techniques for generating and updating digital maps can be performed, as described throughout this document.

In some implementations, a method for improving a digital map may be performed by a computing system. The method includes receiving, by a computing system, original map data for a digital map of a physical space, wherein the original map data specifies the locations of fixtures in the physical space, and specifies items stored at the fixtures; receiving, by the computing system, item location data that represents item scans that have been performed by mobile devices in the physical space, wherein each item location datum includes (i) an item identifier of a scanned item, (ii) a fixture identifier that uniquely identifies a fixture at which the item was stored, and (iii) item location coordinates that indicate a location of a mobile device that scanned the item when the item was scanned; determining that a discrepancy exists for a given fixture in the physical space, based at least in part on a comparison of the original map data and the item location data; in response to determining that the discrepancy exists, generating corrected map data that corrects the discrepancy for the given fixture; and providing, by the computing system, a corrected digital map of the physical space that replaces the original map data for the fixture with the corrected map data for the fixture.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations may include any, all, or none of the following features. The corrected digital map can be provided without updating the original map data. The computing system can receive item location data for item scans that occurred after the corrected map data was generated. A determination can be performed of whether the discrepancy still exits, or a different discrepancy exists for the given fixture in the physical space. In response to determining that the discrepancy still exists, or the different discrepancy exists, previously generated corrected map data that corrects the discrepancy for the giving fixture can be discarded, and corrected map data that corrects the discrepancy or the different discrepancy can be regenerated. The computing system can provide another corrected map of the physical space that replaces the original map data for the fixture with the regenerated corrected map data for the fixture. Determining that the discrepancy exists for the given fixture in the physical space can include identifying an item that has been mapped to the given fixture according to the original map data, retrieving item location data that represents item scans for the item, and determining that a fixture identifier for the item from the item location data does not correspond to the fixture identifier for the item according to the original map data, and that item location coordinates for the item from the item location data correspond to a different fixture according to the original map data. Generating the corrected map data that corrects the discrepancy for the given fixture can include generating corrected map data that specifies that the item is stored at the different fixture and is not stored at the given fixture. Determining that the discrepancy exists for the given fixture in the physical space can include identifying an item that has been mapped to the given fixture according to the original map data, retrieving item location data that represents item scans for the item, and determining that a fixture identifier for the item from the item location data corresponds to the fixture identifier for the item according to the original map data, and that item location coordinates for the item from the item location data correspond to a different location in the physical space than specified in the original map data. Generating the corrected map data that corrects the discrepancy for the given fixture can include generating corrected map data that specifies that the given fixture is located at the different location. Determining that the discrepancy exists for the given fixture in the physical space can includes identifying an item that has been mapped to the given fixture according to the original map data, retrieving item location data that represents item scans for the item, and determining that a fixture identifier for the item from the item location data does not correspond to the fixture identifier for the item according to the original map data, and that item location coordinates for the item from the item location data correspond to the given fixture according to the original map data. Generating the corrected map data that corrects the discrepancy for the given fixture can include generating corrected map data that specifies that the fixture identifier for the given fixture is to be corrected as the fixture identifier from the item location data. The item location data can be received from a location determination system in the physical space. A portion of the fixtures can be in a limited coverage area of the physical space in which the location determination system cannot accurately determine scan locations. A determination can be performed of whether an item scan has occurred in the limited coverage area of the physical space in which the location determination cannot accurately determine scan locations, by determining that a given item location datum includes a fixture identifier that corresponds to a fixture that is located in the limited coverage area, according to the original map data, and determining that the given item location datum includes item location coordinates that are at an edge of a coverage area of the physical space that is adjacent to the limited coverage area. In response to determining that the item scan has occurred in the limited coverage area, the item location coordinates of the given item location datum can be adjusted to be at a fixture that corresponds to the fixture identifier and that is located in the limited coverage area, according to the original map data. The digital map of the physical space can be presented in a map interface, along with a coverage map that indicates, for each location determination device in the location determination system, a working status of the location determination device. The digital map of the physical space can be presented in a map interface. A discrepancy indication can be received through the map interface. The discrepancy indication can indicate a discrepancy location and a discrepancy type. In response to receiving the discrepancy indication, corrected map data can be generated that corrects the discrepancy type at the discrepancy location.

The systems, devices, program products, and processes described throughout this document can, in some instances, provide one or more of the following advantages. Appropriate automated and semi-automated techniques can be used to quickly identify possible map discrepancies and to quickly correct the identified discrepancies. Accurate maps can be provided to customer devices, worker devices, and/or inventory systems, improving the efficiency of these users and/or systems. Accurate maps can also be automatically generated and continually updated without requiring manual interactions, such as identifying of changes to the physical layout or other manual inputs. This can permit for digital maps to be continually updated without human interaction, which can be particularly beneficial when physical spaces are undergoing frequent changes (e.g., retail store undergoing remodeling). Locations can be automatically determined for a fixture in a facility, without collecting or entering data for the express purpose of defining the fixture locations. A digital map can be provided that reflects a current arrangement of a physical space of a facility, without waiting for a source map to be updated directly. Instead, the same source map can be repeatedly used as a starting point, and corrections can be selectively applied to reflect the most recent location data that is available.

Other features, aspects and potential advantages will be apparent from the accompanying description and figures.

DESCRIPTION OF DRAWINGS

Like reference symbols in the various drawings indicate like elements

DETAILED DESCRIPTION

This document describes technology that can providing corrections for a digital map of a physical space, using various techniques for identifying a discrepancy between the physical space (e.g., a facility, such as a store, warehouse, office building, or another type of facility) and the digital map of the physical space, and for updating the digital map of the physical space to correct the discrepancy. In general, maintaining accurate maps of facilities may be challenging, since a facility which a map represents may be altered, with each alteration prompting a corresponding alteration to the map. For example, fixtures such as shelves, racks, workstations, or other relatively fixed objects may be moved, removed, added, and/or relabeled in a retail store, causing a corresponding store map to become inaccurate until it is later updated. Such inaccuracies can cause inefficiencies when the map is provided to customer devices, worker devices, and/or inventory systems. Communicating changes in physical spaces to design personnel and having the design personnel manually update the corresponding maps, for example, may be a cumbersome process. To solve the problem of maintaining updated maps when physical spaces are updated (or simply generating new maps for spaces), with minimal communication overhead and minimal delay, for example, appropriate automated and semi-automated techniques can be used to quickly identify possible map discrepancies and to quickly correct the identified discrepancies.

Figure 1A:
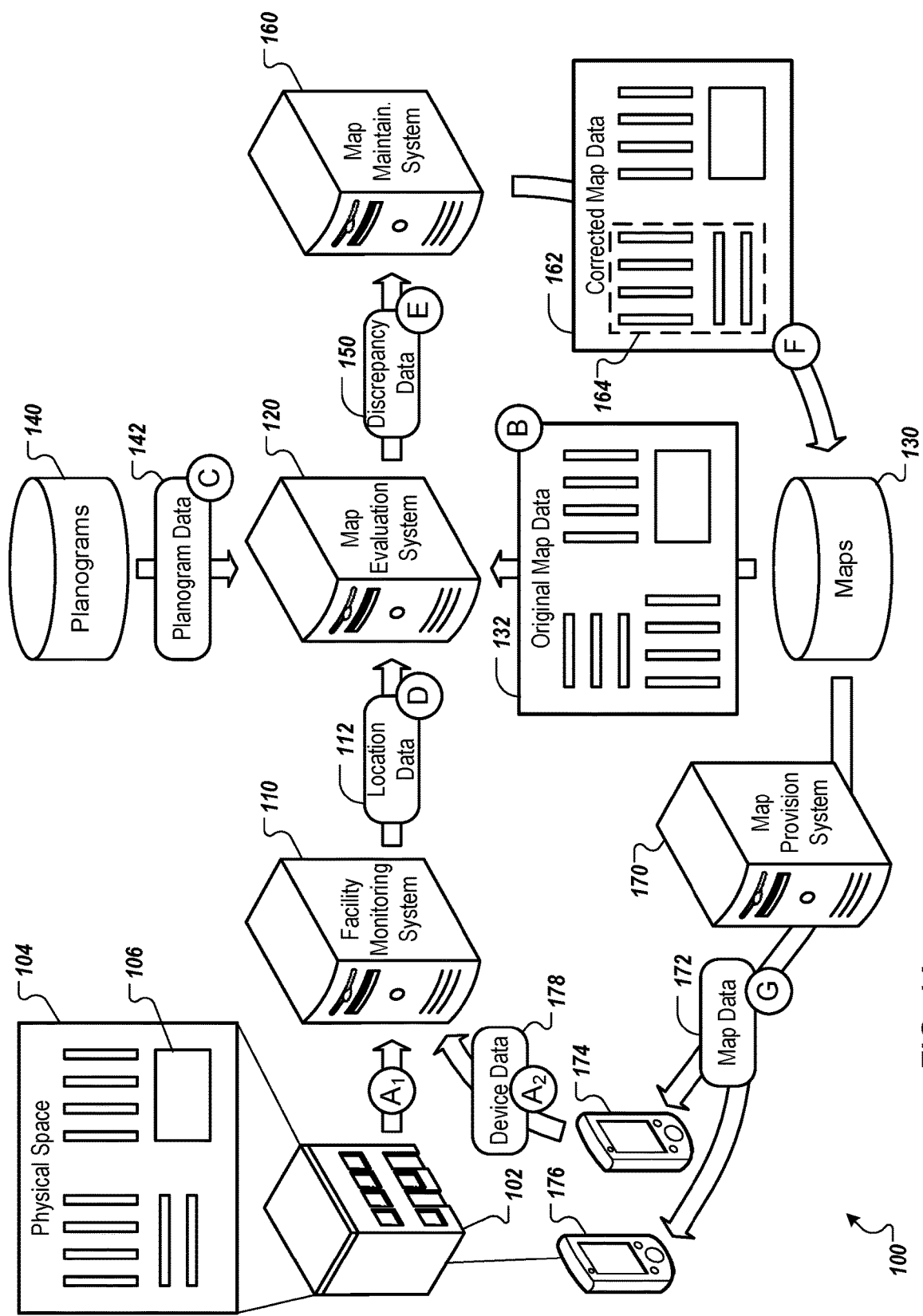
FIG. 1A is a conceptual diagram of an example system for providing corrections for a digital map of a physical space.

FIG. 1A is a conceptual diagram of an example system 100 for providing corrections for a digital map of a physical space. In the depicted example, the system 100 includes a facility monitoring system 110, a map evaluation system 120, a map maintenance system 160, and a map provision system 170. In some examples, each of the systems 110, 120, 160, 170, can include various forms of computing servers, including, but not limited to network servers, web servers, or application servers, and/or can include various forms of computing devices, including, but not limited to, desktop computers, laptop computers, handheld computers, or two or more of these computing devices or other computing devices. In some examples, one or more of the systems 110, 120, 160, 170, can be split into multiple other systems. In some examples, two or more of the systems 110, 120, 160, 170, can be combined into a single system.

FIG. 1A also illustrates an example process flow for providing corrections for a digital map of a physical space, shown in stages (A) to (G). Stages (A) to (G) may occur in the illustrated sequence, or they may occur in a sequence that is different than in the illustrated sequence, and/or two or more stages (A) to (G) may be concurrent.

During stage ($A_1$), the facility monitoring system 110 monitors a physical space 104 of a facility 102. For example, the facility 102 can be a building such as a retail store, a warehouse, an office, or another sort of building that includes an indoor space in which various fixtures (e.g., shelves, racks, workstations, or other relatively fixed objects) are located. To monitor the physical space 104 of the facility 102, for example, the facility monitoring system 110 can include and/or communicate with various data collection devices, that may include cameras, barcode scanners, radio frequency (RF) sensors, device location sensors (e.g., Global Positioning System (GPS) devices, Wi-Fi location tracking devices, Bluetooth location tracking devices, etc.), and/or other suitable data collection components. For example, a worker in the facility 102 can use a mobile computing device 176 that includes one or more device location sensors and/or transmitters, and one or more object identification sensors (e.g., cameras, barcode scanners, RF scanners, etc.), and can execute an application (e.g., including same or similar features as applications described below with respect to the mobile device 174) to capture (and/or enter) object identifiers for various objects (e.g., products, items, fixtures, etc.) distributed throughout they physical space 104 of the facility 102. As another example, a robotic vehicle can include one or more device location sensors and object identification sensors, and can be used to travel throughout the physical space 104 of the facility 102 and collect object identification data. A current location of a device (e.g., mobile computing device 176) that identifies the object in the facility 102 may be assigned as the object's location by the facility monitoring system 110 (e.g., based on GPS data, wireless signal triangulation data (e.g., Wi-Fi, Bluetooth, etc.), user-entered data, or other suitable location data). In general, data collected by the facility monitoring system 110 (e.g., data that corresponds to the current location of the mobile computing device 176 being operated by a worker, a robotic vehicle, etc.) may be considered to be trusted data with respect to a location of an object identified by the device being the object's actual location within the facility 102.

During stage ($A_2$), the facility monitoring system 110 optionally receives device data 178 from a mobile device 174 (e.g., a mobile device being operated by a customer of a retail store). The mobile device 174, can be a mobile computing device such as a smartphone, a tablet, a personal digital assistant, or another suitable type of mobile computing device that includes one or more device location sensors and/or transmitters, and one or more object identification sensors (e.g., cameras, barcode scanners, RF scanners, etc.). For example, the mobile device 174 can execute a mobile application (e.g., a product information application, a couponing application, or another sort of application) which can be used to capture an identifier of an object (e.g., a product, an item, a fixture, etc.) within the physical space 104 of the facility 102. In response to the capture of the object identifier, for example, the mobile device 174 can provide the device data 178 to the facility monitoring system 110 that indicates the captured object identifier and a location of the device at which the capture occurred. As another example, the mobile device 174 can execute a mapping application that periodically (e.g., once per second, twice per second, three times per second, or at another suitable time interval) determines a location of the device within the facility 102 without being associated with any particular object identifier in the facility 102, such that a current location of the device can be included as an icon on a map of the physical space 104 of the facility 102 presented by the device, and/or a device path throughout the facility may be determined. The location of the mobile device 174, for example, can be based on GPS data, wireless signal triangulation data (e.g., Wi-Fi, Bluetooth, etc.), user-entered data, or other suitable location data, and can be provided after receiving appropriate permission from a device user. In general, data received by the facility monitoring system 110 from individual mobile devices 174 (e.g., devices being operated by customers) may be considered as untrusted data with respect to a location a single device that identifies an object being the object's actual location within the facility 102 (e.g., some users may scan a product at a location that is distant from the product's stored location), however aggregated data from multiple different mobile devices (e.g., using one or more clustering techniques) may be considered as trusted data.

Figure 1B:
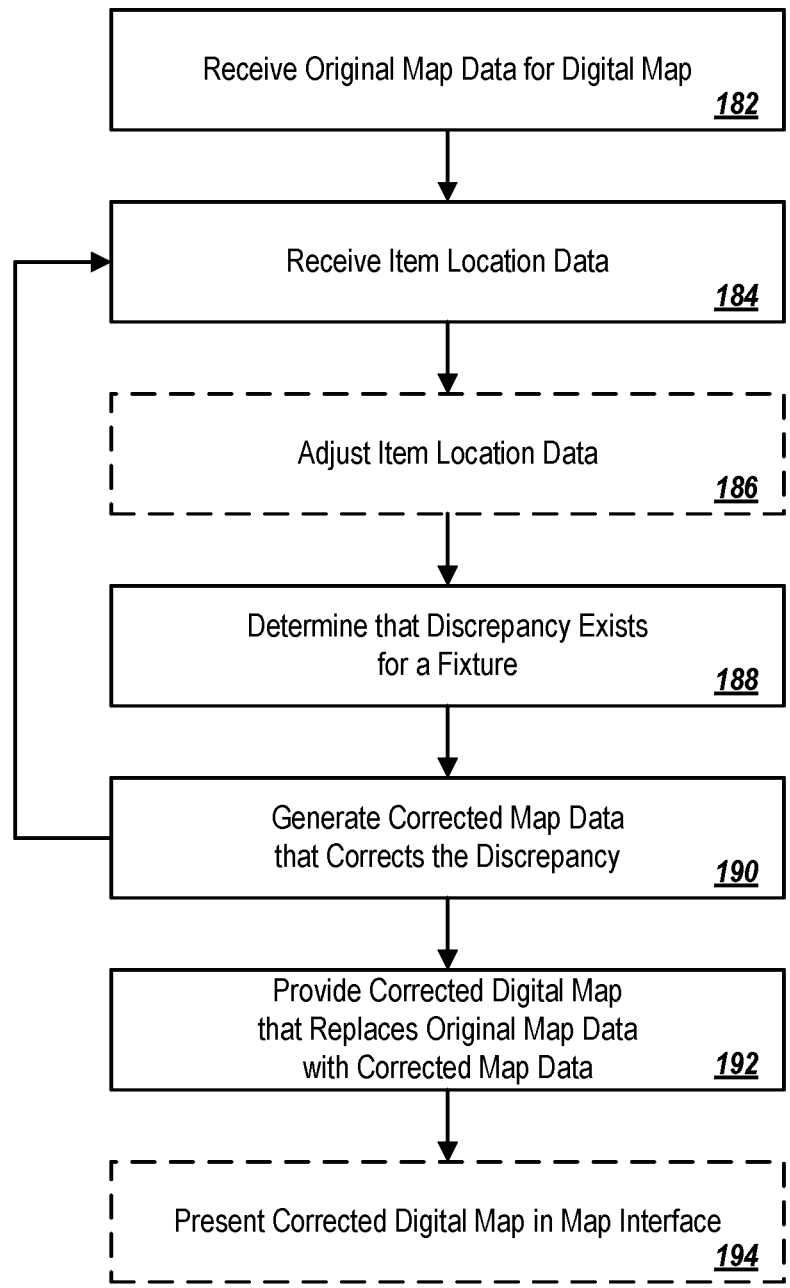
FIG. 1B shows an example process for providing corrections for a digital map of a physical space.

Referring now to FIG. 1B, an example process 180 for providing corrections for a digital map of a physical space is shown. The process 180 can be performed by components of the system 100, for example, and will be described with reference to FIG. 1A. However, other systems may be used to perform the same or similar process.

At box 182, original map data for a digital map of a physical space is received. Referring to FIG. 1A, for example, during stage (B), the map evaluation system 120 receives original map data 132 for an original map of the physical space 104 (e.g., a base map, before possible corrections are applied) from a maps data source 130 (e.g., a database, a file system, and/or a cached data source). In general, original map data can specify the locations of fixtures in a physical space according to an original plan for a physical space. For example, the original map data 132 can include data that defines locations, sizes, and orientations of various fixtures (e.g., shelves, racks, workstations, or other relatively fixed objects), planned areas (e.g., sections, departments, etc.), walls, rooms, doorways, and other mapped objects and areas within the physical space 104 of the facility 102. The original map data 132, for example, can also include and/or reference planogram data that provides map coordinates for various planogram locations (e.g., placement locations for items within a facility). In some implementations, map data may be provided in a computer file format generated by a software application used for designing a mapped space. For example, the original map data 132 can be a computer-aided design (CAD) file (or another suitable file), or can be based on such a file.

In some implementations, map data can specify (and/or reference) items stored at fixtures in a physical space. During stage (C), for example, the map evaluation system 120 can receive planogram data 142 from a planograms data source 140 (e.g., a database, a file system, and/or a cached data source). For example, the planogram data 142 can define various planogram locations that indicate one or more assigned placement locations for items (e.g., products) and/or fixtures within the physical space 104 of the facility 102. An assigned placement location, for example, can include a facility address, such as a block, an aisle, and a section of a retail store.

At box 184, item location data is received that represents item scans that have been performed by mobile devices in the physical space. During stage (D), for example, the map evaluation system 120 can receive item location data 112 from the facility monitoring system 110. For example, the item location data 112 can include location data that corresponds to locations of various items (e.g., products, etc.) within the physical space 104 of the facility 102 as determined by mobile device(s) 176 of the facility monitoring system 110 (e.g., devices being operated by workers) during stage A$_1$ and/or mobile device(s) 174 (e.g., devices being operated by customers) during stage A$_2$. In general, item location data can include item identifiers of items that have been scanned by mobile devices, fixture identifiers that uniquely identify fixtures at which the items have been scanned, and item location coordinates (e.g., according to an XY coordinate system) that indicate locations of mobile devices that scanned the items, at the times of the scans. For example, a worker can use the mobile device 176 in the physical space 104 (e.g., a retail store, a warehouse, etc.) to scan items (e.g., products) while collecting the items to fulfill an order, while tallying inventory, or while performing another sort of task in the physical space 104. As another example, a customer can use the mobile device 174 in the physical space 104 to scan items while shopping. An item can be removed from a fixture (e.g., a shelf) and scanned (e.g., a captured image, a barcode scan, an RF scan, or another sort of scan) by the mobile device 174, for example, or can be scanned in place. After the item has been scanned by a mobile device, for example, a identifier of the item, a location of the mobile device when the scan was performed (e.g., according to GPS data, wireless signal triangulation data (e.g., Wi-Fi, Bluetooth, etc.), user-entered data, or other suitable location data), and, optionally, an identifier of the fixture which had stored the item (e.g., based on another device scan or user-entered data) can be provided by the mobile device to the facility monitoring system 110.

At box 186, item location data is optionally adjusted. For example, an item scan may occur at a location in the physical space 104 of the facility 102 that is not adequately covered by the facility monitoring system 110 (e.g., the item scan may occur in a limited, low, and/or faulty coverage area). A limited coverage area 106 of the physical space 104, for example, can be an area that is not adequately covered by location determination devices of the facility monitoring system 110 (e.g., an area in which the location determination devices do not exist and/or an area that is physically separated from the rest of the space, such as a stockroom or another sort of physically separated space), or can be an area in which location determination devices of the facility monitoring system 110 are currently malfunctioning. In general, the location data of item scans that occur in such a limited coverage area (or are determined as having possibly occurred in the area) can be adjusted from an initial location (e.g., a potentially incorrect location), to an adjusted location.

In the present example, item location data 112 that has been received from the facility monitoring system 110 can be adjusted, when the item location data 112 represents an item scan that has been determined as likely having occurred in the limited coverage area 106 of the physical space 104 of the facility 102. For example, the physical space 104 includes various fixtures, some of the fixtures being in the limited coverage area 106 and some of the fixtures being outside of the limited coverage area (e.g., an area of sufficient coverage in the physical space 104). After receiving the item location data 112, for example, the map evaluation system 120 can determine whether an item scan represented in the item location data 112 has likely occurred in the limited coverage area 106, by determining that an item location datum includes a fixture identifier that corresponds to a fixture that is located in the limited coverage area 106 (e.g., according to the original map data 132 and/or the planogram data 142), and by determining that the item location datum includes item location coordinates that are at an edge of a coverage area of the physical space that is adjacent to the limited coverage area 106. If the fixture identifier of an item location datum for an item scan indicates that the scan occurred within the limited coverage area 106, and the item location coordinates are near the edge of the limited coverage area 106 (e.g., within a threshold distance of the edge and in an area of the physical space 104 that has adequate location determination coverage by the facility monitoring system 110), for example, the map evaluation system 120 can determine that the item scan likely occurred at the identified fixture in the limited coverage area 106, but that its location was likely inaccurately determined by the facility monitoring system 110. In the present example, the map evaluation system 120 can adjust the item location coordinates of the item location datum to be at a fixture that corresponds to the fixture identifier, and that is located in the limited coverage area 106.

At box 188, a determination is performed of whether a discrepancy exists for a fixture in the physical space, based at least in part on a comparison of the original map data and the item location data. Based on the original map data 132 and the associated planogram data 142 for the physical space 104 of the facility 102, and based on the received item location data 112, for example, the map evaluation system 120 can determine whether the defined locations of the various objects (e.g., fixtures, planned areas, walls, rooms, doorways, and other mapped objects and areas within the facility 102) and items (e.g., products) according the original map data 132 are accurate or inaccurate. Various techniques for identifying discrepancies are described below with respect to FIGS. 2A-B, FIGS. 3A-B, and FIGS. 4A-B.

Figure 2A:
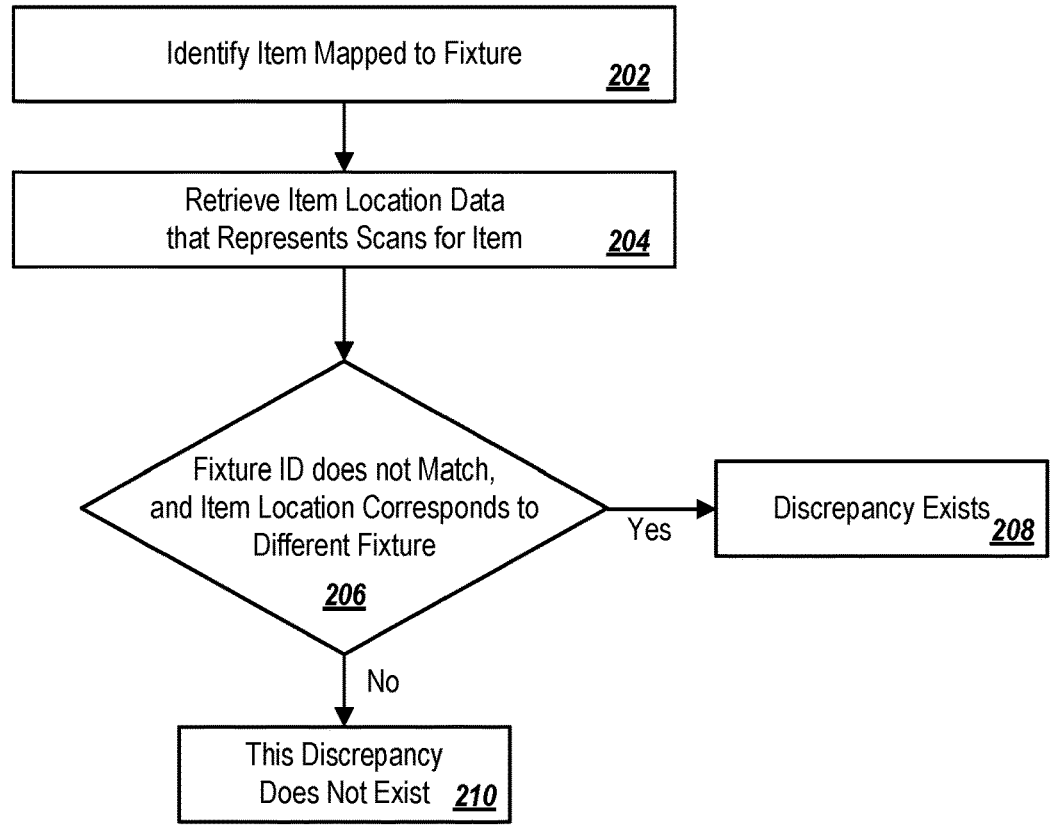
FIGS. 2A-B, 3A-B, and 4A-B each show an example process and example data for identifying a discrepancy between a physical space and a digital map of the physical space using original map data and item location data.
Figure 2B:
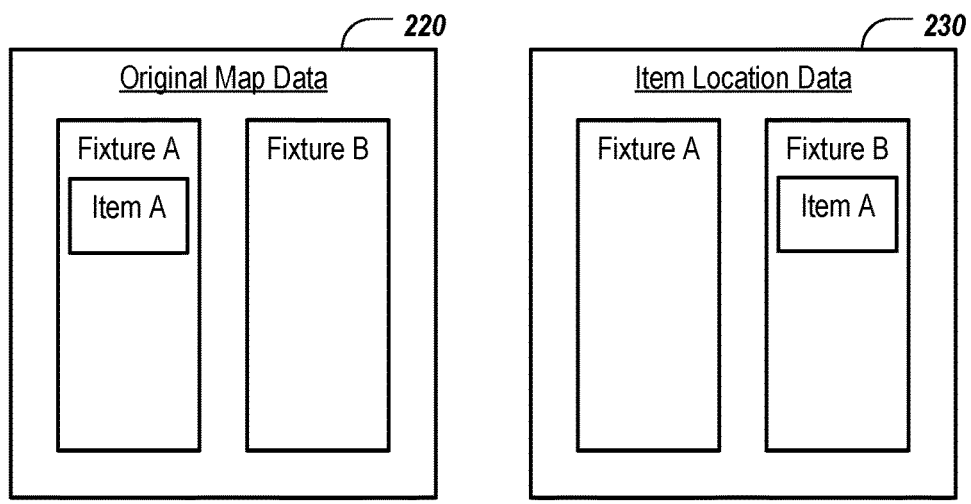

Referring now to FIGS. 2A-B, an example process 200 (FIG. 2A) and example data 220, 230 (FIG. 2B) are shown for identifying a discrepancy between a physical space and a digital map of the physical space using original map data and item location data. The process 200 can be performed by components of the system 100, for example, and will be described with reference to FIG. 1A. However, other systems may be used to perform the same or similar process.

At box 202, an item that has been mapped to a fixture according to original map data can be identified. For example, the map evaluation system 120 can receive original map data 132 and planogram data 142 for a fixture and an item in the physical space 104 of the facility 102. The original map data 132, for example, can specify a location (e.g., according to an XY coordinate system) and orientation for the fixture in the physical space 104. The planogram data 142, for example, can specify a unique identifier for the fixture (e.g., including a block, aisle, and/or section identifier) in the physical space 104 of the facility 102, mapped to identifiers of various items (e.g., products) that are expected to be stored at the fixture, according to a planogram. In the present example (shown in FIG. 2B), original map data 220 (e.g., representing a portion of the original map data 132 and the planogram data 142) indicates that Item A is expected to be at Fixture A, and that Fixture A is expected to be at a first location in the physical space 104.

At box 204, item location data that represents item scans for the item can be retrieved. For example, the map evaluation system 120 can receive item location data 112 from the facility monitoring system 110 that includes item location data 230 (shown in FIG. 2B). The item location data 230, for example, can be based on an item capture by a mobile device (e.g., a scan of a product's barcode, a scan of a product's RF tag, a photograph of the product, or another sort of identification capture performed by a mobile device operating in the physical space 104 of the facility 102). The item location data 230, for example, can include an identifier of the item, can include an identifier of a fixture at which the item was stored (e.g., based on another capture or on user entered data), and can include a location (e.g., according to an XY coordinate system) of the mobile device when the item capture occurred. The item location data 230, for example, can represent a single item scan, or can represent an aggregation of multiple item scans over time (e.g., an hour, a day, a week, or another suitable aggregation time window). In the present example, the item location data 230 (e.g., representing a portion of the item location data 112) indicates that an identifier for Item A was captured at Fixture B, and that the capture occurred at a second location in the physical space 104 that is different from the first location indicated by the original map data 220.

At 206, a determination is performed of whether the fixture identifier for the item from the item location data corresponds to the fixture identifier for the item according to the original map data, and whether item location coordinates for the item from the item location data correspond to a different fixture according to the original map data. If so, a discrepancy exists (box 208), or if not, this particular discrepancy does not exist (box 210). In the present example, the fixture identifier for Item A from the item location data 230 indicates that the item was actually located at Fixture B, which does not correspond to the fixture identifier for Item A according to original map data 220 (which indicates that Item A was expected at Fixture A). Further, in the present example, item location coordinates for Item A from the item location data 230 indicate that the item capture occurred at a different fixture location (e.g., the second location) rather than at the expected fixture location (e.g., the first location), according to a fixture layout specified in the original map data 220. For example, instances of Item A may have been moved from Fixture A to Fixture B, without updating the original map data 220 to reflect the change. Thus, in the present example, the discrepancy exists (box 208).

Figure 3A:
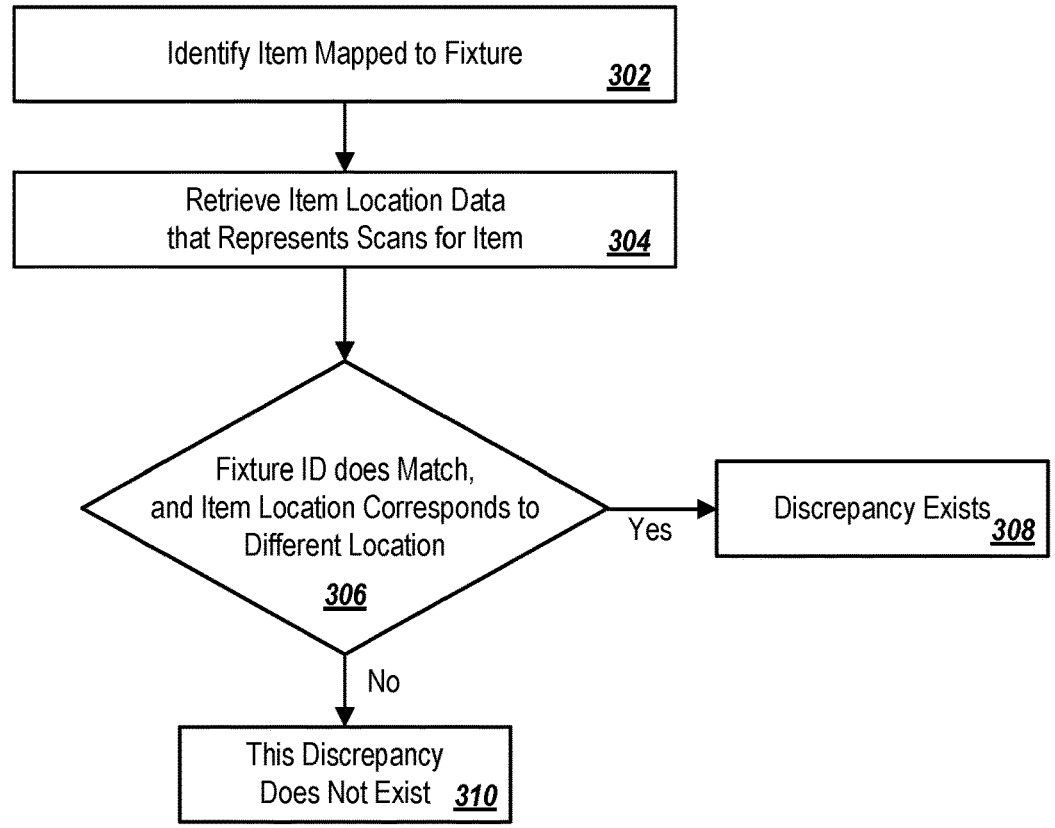
Figure 3B:
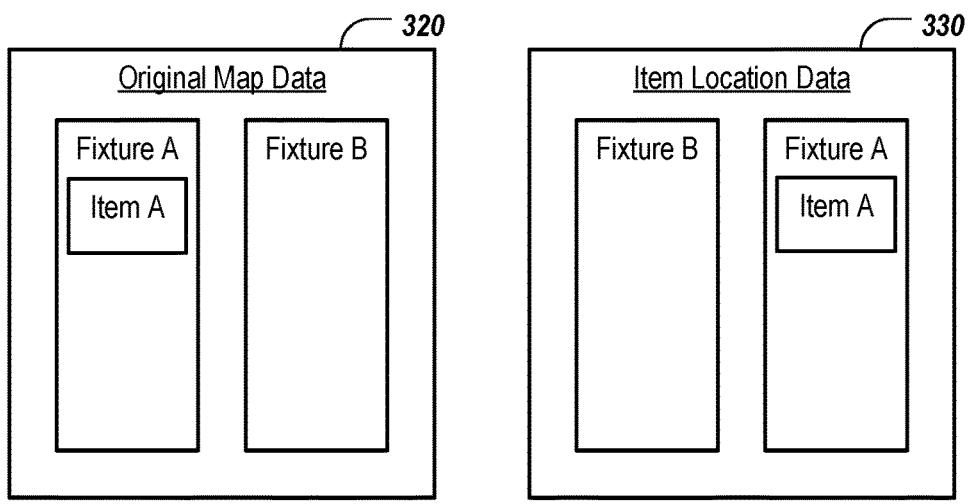

Referring now to FIGS. 3A-B, an example process 300 (FIG. 3A) and example data 320, 330 (FIG. 3B) are shown for identifying a discrepancy between a physical space and a digital map of the physical space using original map data and item location data. The process 300 can be performed by components of the system 100, for example, and will be described with reference to FIG. 1A. However, other systems may be used to perform the same or similar process.

At box 302, an item that has been mapped to a fixture according to original map data can be identified. Similar to box 202 (e.g., described above with respect to FIG. 2A), the map evaluation system 120 can receive original map data 132 and planogram data 142 for a fixture and an item in the physical space 104 of the facility 102. In the present example (shown in FIG. 3B), original map data 320 (e.g., representing a portion of the original map data 132 and the planogram data 142) indicates that Item A is expected to be at Fixture A, and that Fixture A is expected to be at a first location in the physical space 104.

At box 304, item location data that represents item scans for the item can be retrieved. Similar to box 204 (e.g., described above with respect to FIG. 2A), the map evaluation system 120 can receive item location data 112 from the facility monitoring system 110 that includes item location data 330. In the present example (shown in FIG. 3B), the item location data 330 (e.g., representing a portion of the item location data 112) indicates that an identifier for Item A was captured at Fixture A, and that the capture occurred at a second location in the physical space 104 that is different from the first location indicated by the original map data 320.

At box 306, a determination is performed of whether a fixture identifier for the item from the item location data corresponds to the fixture identifier for the item according to the original map data, and whether item location coordinates for the item from the item location data correspond to a different location in the physical space than specified in the original map data. If so, a discrepancy exists (box 308), or if not, this particular discrepancy does not exist (310). In the present example, the fixture identifier for Item A from the item location data 330 indicates that the item was actually located at Fixture A, which corresponds to the fixture identifier for Item A according to the original map data 320 (which indicates that Item A was expected at Fixture A). However, in the present example, item location coordinates for Item A from the item location data 330 indicate that the item capture occurred at a different fixture location (e.g., the second location) rather than at the expected fixture location (e.g., the first location), according to a fixture layout specified in the original map data 320. For example, instances of Item A may have been moved to a different fixture in the physical space and the different fixture may have been relabeled with the identifier for Fixture A (or the original fixture may have been moved), without updating the original map data 320 to reflect the change. Thus, in the present example, the discrepancy exists (box 308).

Figure 4A:
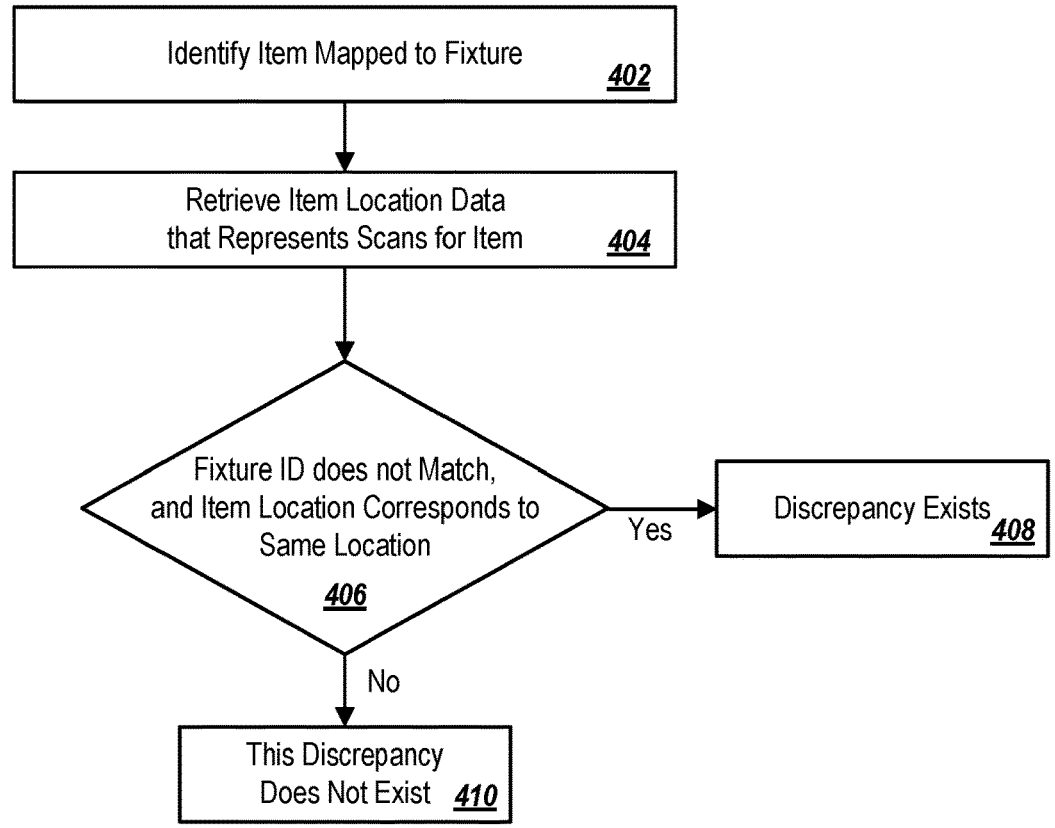
Figure 4B:
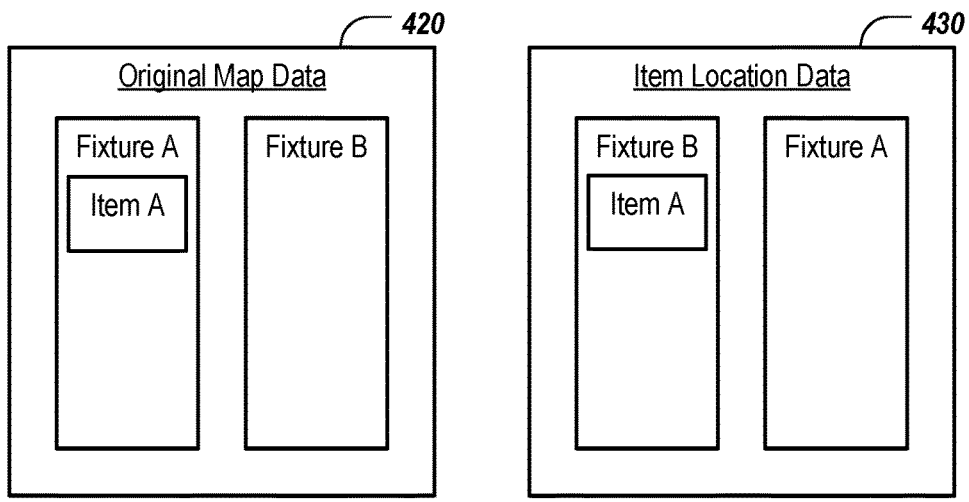

Referring now to FIGS. 4A-B, an example process 400 (FIG. 4A) and example data 420, 430 (FIG. 4B) are shown for identifying a discrepancy between a physical space and a digital map of the physical space using original map data and item location data. The process 400 can be performed by components of the system 100, for example, and will be described with reference to FIG. 1A. However, other systems may be used to perform the same or similar process.

At box 402, an item that has been mapped to a fixture according to original map data can be identified. Similar to box 202 and 302 (e.g., described above with respect to FIGS. 2A and 3A), the map evaluation system 120 can receive original map data 132 and planogram data 142 for a fixture and an item in the physical space 104 of the facility 102. In the present example (shown in FIG. 4B), original map data 420 (e.g., representing a portion of the original map data 132 and the planogram data 142) indicates that Item A is expected to be at Fixture A, and that Fixture A is expected to be at a first location in the physical space 104.

At box 404, item location data that represents item scans for the item can be retrieved. Similar to box 204 and 304 (described above with respect to FIGS. 2A and 3A), the map evaluation system 120 can receive item location data 112 from the facility monitoring system 110 that includes item location data 430. In the present example, (shown in FIG. 4B), the item location data 430 (e.g., representing a portion of the item location data 112) indicates that an identifier for Item A was captured at Fixture B, and that the capture occurred at a first location in the physical space 104 that is the same location as the first location indicated by the original map data 420.

At box 406, a determination is performed of whether a fixture identifier for the item from the item location data does not correspond to the fixture identifier for the item according to the original map data, and whether item location coordinates for the item from the item location data correspond to the given fixture according to the original map data. If so, a discrepancy exists (box 408), or if not, this particular discrepancy does not exist (410). In the present example, the fixture identifier for Item A from the item location data 430 indicates that the item was actually located at Fixture B, which does not correspond to the fixture identifier for Item A according to the original map data 420 (which indicates that Item A was expected at Fixture A). However, in the present example, item location coordinates for Item A from the item location data 430 indicate that the item capture occurred at a same fixture location as the expected fixture location (e.g., the first location), according to a fixture layout specified in the original map data 420. For example, Fixture A may have been relabeled with the identifier of Fixture B, without updating the original map data 420 to reflect the change. Thus, in the present example, the discrepancy exists (box 408).

In the examples described in this document, determining whether two or more locations are a same location or a different location can include determining whether the locations are within a threshold range (e.g., a foot, two feet, five feet, ten feet, or another suitable threshold range) of each other. For example, if two locations are within the threshold range, they can be considered as being a same location, whereas if the two locations are outside of the threshold range, they can be considered as being different locations. As another example, an item location (or an aggregated item location) can be considered as being at a fixture location if the item location is within a threshold range of any portion of a perimeter of the fixture location.

Referring again to FIG. 1A, if a discrepancy is identified for a fixture in a physical space (e.g., using one or more of the techniques described with respect to FIGS. 2A-B, FIGS. 3A-B, and/or FIGS. 4A-B), for example, corresponding discrepancy data 150 can be provided to the map maintenance system 160 during stage (E). For example, the discrepancy data 150 can include location coordinates for an area of the physical space 104 that is associated with a possible discrepancy, an identifier for a fixture and/or item that is associated with the possible discrepancy, and optional planogram information (e.g., including planogram information for one or more items) for the possible discrepancy.

Referring again to FIG. 1B, at box 190, in response to determining that the discrepancy exists, corrected map data is generated that corrects the discrepancy for the fixture. Referring again to FIG. 1A, during stage (F), for example, one or more corrections to a digital map of the physical space 104 can be provided by the map maintenance system 160 to correct one or more discrepancies indicated by the discrepancy data 150. In the present example, the corrected map data 162 includes one or more digital map corrections 164 that specify current locations and orientations of fixtures and items within the physical space 104 facility 102, according to the item location data 112. The corrected map data 162 including the one or more digital map corrections 164 can be stored in the maps data source 130, for example.

In general, digital map corrections can be discrete map updates that can be selectively applied to an original digital map (e.g., as a digital patch), such that portions of the digital map that have been determined as being correct (or at least have not been found to be incorrect) can be left unchanged, and such that portions of the digital map that have been determined as being incorrect can be modified through selective applications of the digital map corrections. The digital map corrections, for example, can generally reflect the locations and relationships of fixtures and items as identified through the item location data 112 received from the facility monitoring system 110. Referring again to FIG. 2B, for example, in response to determining that a fixture identifier for an item from the item location data (e.g., Fixture B) does not correspond to the fixture identifier for the item according to the original map data (e.g., Fixture A), and determining that item location coordinates for the item from the item location data correspond to a different fixture according to the original map data, generating the corrected map data that corrects the discrepancy for the fixture can include specifying that the item is stored at the different fixture (e.g., Fixture B). Referring again to FIG. 3B, for example, in response to determining that a fixture identifier for an item from the item location data (e.g., Fixture A) corresponds to the fixture identifier for the item according to the original map data (e.g., Fixture A), and that item location coordinates for the item from the item location data correspond to a different location in the physical space, generating the corrected map data that corrects the discrepancy for the fixture can include specifying that the fixture is located at the different location. Referring again to FIG. 4B, for example, in response to determining that a fixture identifier for the item from the item location data (e.g., Fixture A) does not correspond to the fixture identifier for the item according to the original map data (e.g., Fixture B), and that item location coordinates for the item from the item location data correspond to the fixture according to the original map data, generating the corrected map data that corrects the discrepancy for the fixture can include specifying that the fixture identifier for the fixture is to be corrected as the fixture identifier from the item location data (e.g., Fixture A). The various sorts of digital map discrepancies (and corrections) described in this document are not exhaustive, and can be applied in varying combinations. For example, two or more of the sorts of discrepancies/corrections described in any of FIGS. 2A-B, 3A-B, and 4-B can be determined and applied together.

In general, the operations described above at boxes 184, 186, 188, and 190, can be performed iteratively. For example, after the corrected map data 162 that includes the one or more digital map corrections 164 is generated by the map maintenance system 160, the map evaluation system 120 can receive new item location data 112 for item scans that occurred after the corrected map data 162 was generated. After receiving the new item location data 112, for example, the map evaluation system 120 can determine that a particular discrepancy still exists for a particular fixture (and/or item), or that a new, different sort of discrepancy exists in the physical space 104. For example, the fixture may have been relabeled, the fixture may have been moved, items may have been added to the fixture, and/or items may have been removed from the fixture in such a way that does not conform to the original map data 132 and/or the planogram data 142. In response to determining that the discrepancy still exists (or that the different sort of discrepancy now exists), the previously generated corrected map data 162 that corrects the discrepancy can be discarded, and new corrected map data 162 can be generated that again corrects the discrepancy (or the new, different sort of discrepancy). After regenerating the corrected map data 162, for example, another corrected map of the physical space 104 can be provided that replaces the original map data for the fixture with the regenerated and corrected map data for the fixture. By periodically (e.g., every hour, day, week, or at another suitable time interval) regenerating corrected map data (or by regenerating corrected map data on demand, in response to a map request), for example, a digital map can be provided that reflects a current arrangement of a physical space of a facility, without waiting for the original map to be updated directly. Instead, the same original map can be repeatedly used as a starting point in multiple iterations, and corrections can be selectively applied to reflect the most recent item location data that is available. The original map can then later be updated according to a schedule that suits the administrators of the facility 102.

At box 192, a corrected digital map of the physical space can be provided that replaces the original map data for the fixture with the corrected map data for the fixture, and at box 192, a corrected digital map can be optionally presented in a map interface. In general, a corrected digital map can be provided without updating the original map data. During stage (G), for example, the map provision system 170 can access the maps data source 130 and provide map data 172 corresponding to a corrected digital map of the physical space 104 of facility 102 (e.g., by selectively applying the corrected map data 162), for presentation by the mobile device 174 and/or the mobile device 176, without updating the original map data 132. The map data 172, for example, can be used by a mapping application executed by the mobile devices 174, 176 to facilitate navigation through the facility 102, an application executed by a computing device included in (or in communication with) the facility monitoring system 110, or an application executed by another system. As another example, the map data 172 (and/or the original map data 132) can be used by a map correction application executed by a computing device to facilitate the identification of map discrepancies and the generation of map corrections.

Referring now to FIGS. 5A-D, respective example interfaces 500*a-d* for presenting (and optionally, providing corrections for) digital maps of a physical space are shown. For example, the interfaces 500*a-d* can present a digital map (e.g., digital maps 520*a-d*) of a physical space, based on the original map data 132 and the planogram data 142. In response to various control selections, for example, the interfaces 500*a-d* can selectively overlay graphical icons that represent item scans that have occurred in the physical space 104, based on the item location data 112.

Figure 5A:
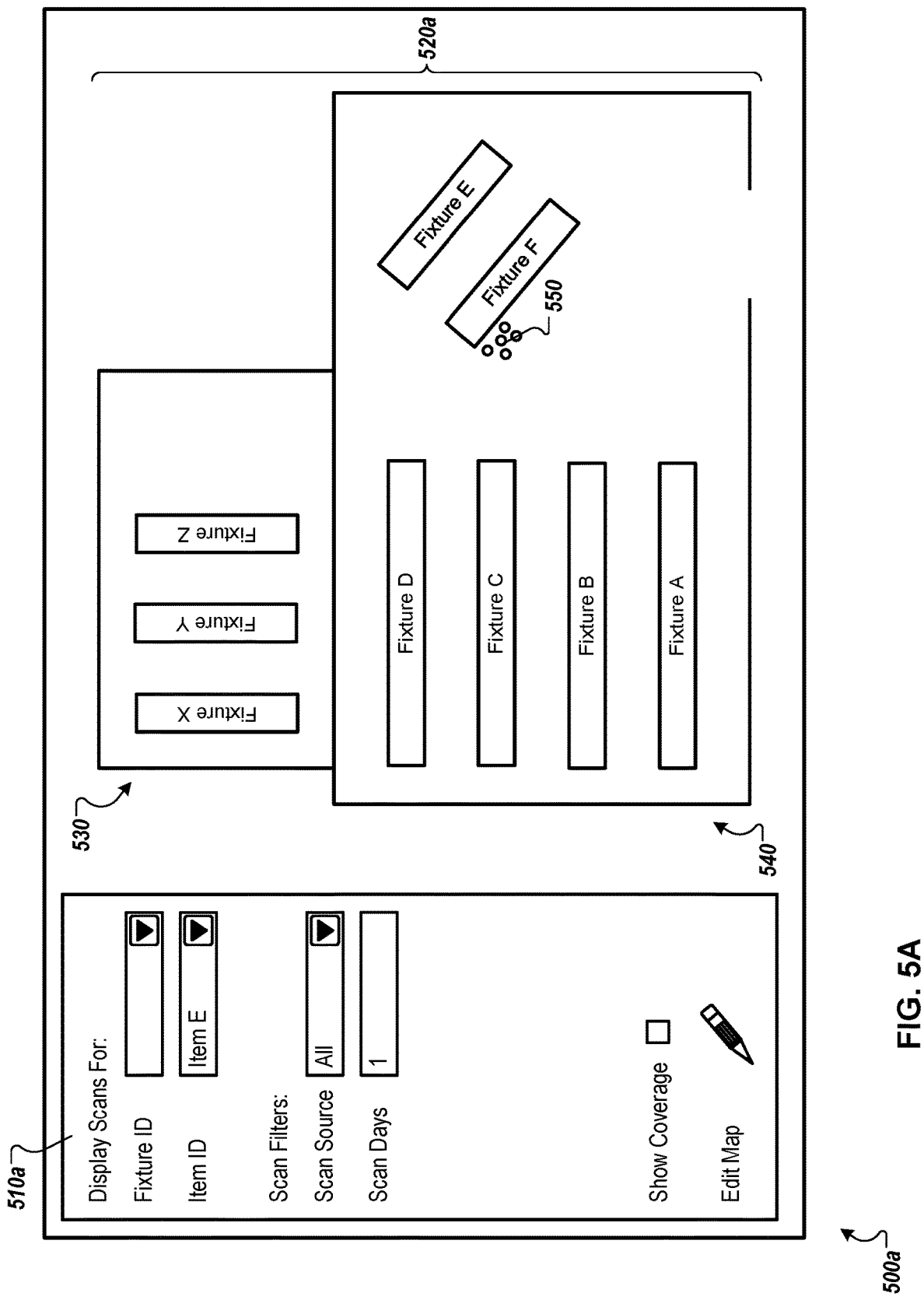
FIGS. 5A-D show example interfaces for presenting and/or providing corrections for a digital map of a physical space.

Referring to FIG. 5A, for example, the interface 500*a* includes a set of controls 510*a* for specifying the representations of item scan data that are to be presented with the digital map 520*a*. For example, a user of the interface 500*a* can interact with controls that specify that data is to be presented for item scans that are associated with a particular item and/or a particular fixture, and controls that specify various data filters to be applied when presenting the representations of the item scan data. The filters specified through the data filter controls, for example, can include a scan source (e.g., all item scan data, item scan data that resulted from a particular sort of device, item scan data that resulted from a particular sort of application, etc.), a scan time filter for which to present representations of item scan data (e.g., a time range or time period, such as a number of days, hours, etc.), and other sorts of data filters. In the present example, a user of the interface 500*a* has indicated through selections of the controls 510*a* that representations of item scan data for Item E that occurred within the most recent day for all scan sources, are to be presented with the digital map 520*a*.

As shown in FIG. 5A, in response to the user selection of the controls 510*a* of the interface 500*a*, a cluster of item scan data representations 550 are presented with the digital map 520*a*, which includes a map of a facility area 530 (e.g., a stockroom) and a facility area 540 (e.g., a retail floor area), each area including various labeled fixtures. Each item scan data representation (e.g., a graphical icon) in the cluster of item scan data representations 550, for example, represents an occurrence of a different scan of the selected item (e.g., Item E). In the present example, Item E is expected to be located at Fixture E (e.g., according to the original map data 132 and the planogram data 142). However, according to the item location data 112, scans of Item E have actually occurred at Fixture F. The discrepancy in the location of item scan data associated with Item E, for example, can be attributed to various causes, including a potential error in the planogram data 142 for Item E. Thus, in the present example, the interface 500*a* can be used to identify (and potentially correct) the discrepancy in the location of Item E.

Figure 5B:
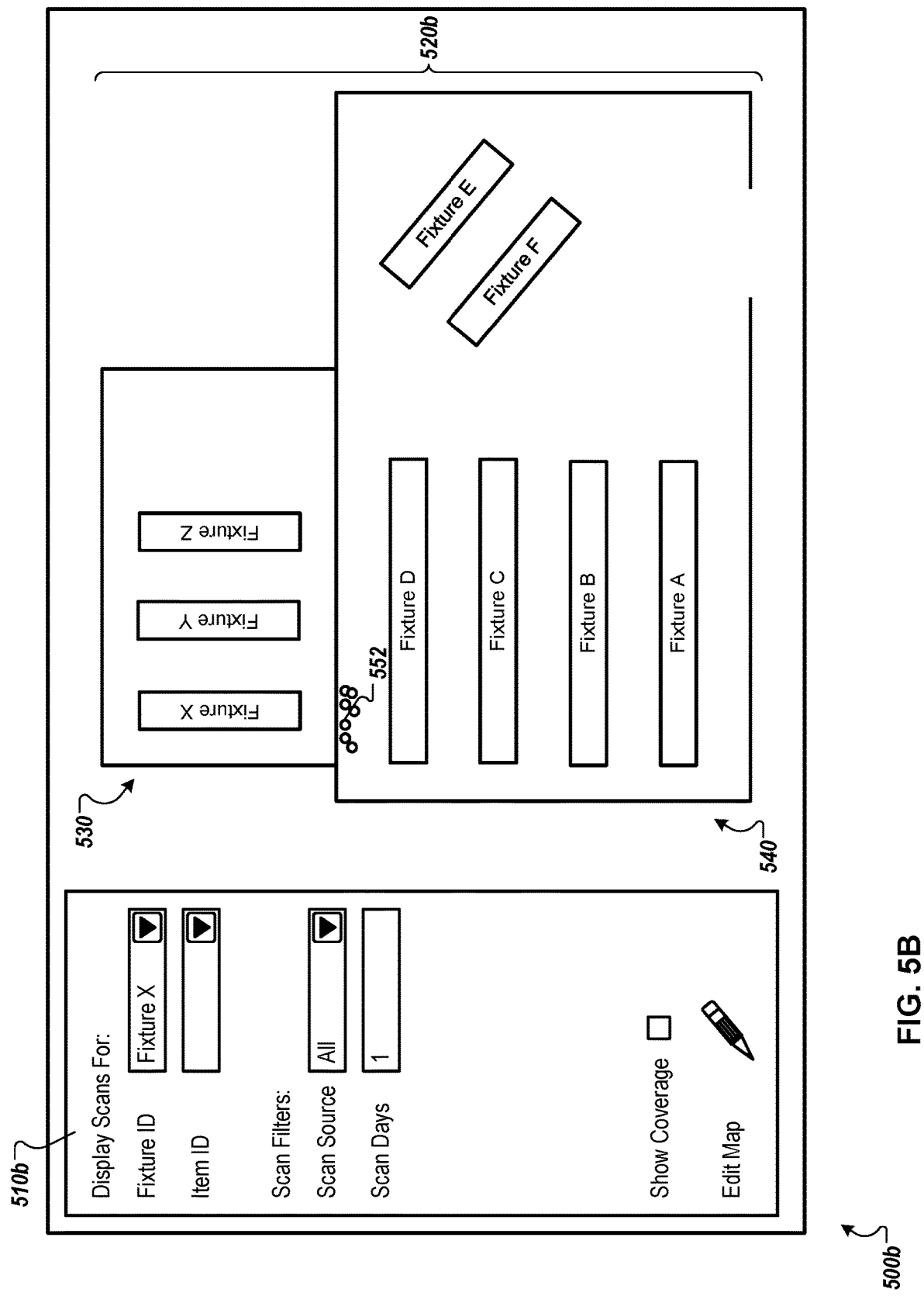

Referring now to FIG. 5B, for example, in response to a different user selection (e.g., a user selection of the controls 510*b* of the interface 500*b* that specifies that item scans associated with Fixture X are to be displayed), a cluster of item scan data representations 552 are presented with the digital map 520*b*. Each item scan data representation (e.g., a graphical icon) in the cluster of item scan data representations 552, for example, represents an occurrence of a different scan of an item that is expected to be located at the selected fixture (e.g., Fixture X), according to the original map data 132 and the planogram data 142. However, in the present example, the cluster of item data representations is located in the facility area 540 (e.g., the retail floor area), whereas Fixture X is located in the facility area 530 (e.g., the stockroom). As shown in the present example, the item scan data representations 552 are at the edge of a location determination coverage area for the facility area 540 (e.g., the retail floor area) that is adjacent to a limited coverage area for the facility area 530 (e.g., the stockroom). The discrepancy in the location of item scan data associated with Fixture X, for example, can be attributed to various causes, including a possible coverage issue related to the facility monitoring system 110. Thus, in the present example, the interface 500b can be used to identify (and potentially correct) the discrepancy in the location of Fixture X.

Figure 5C:
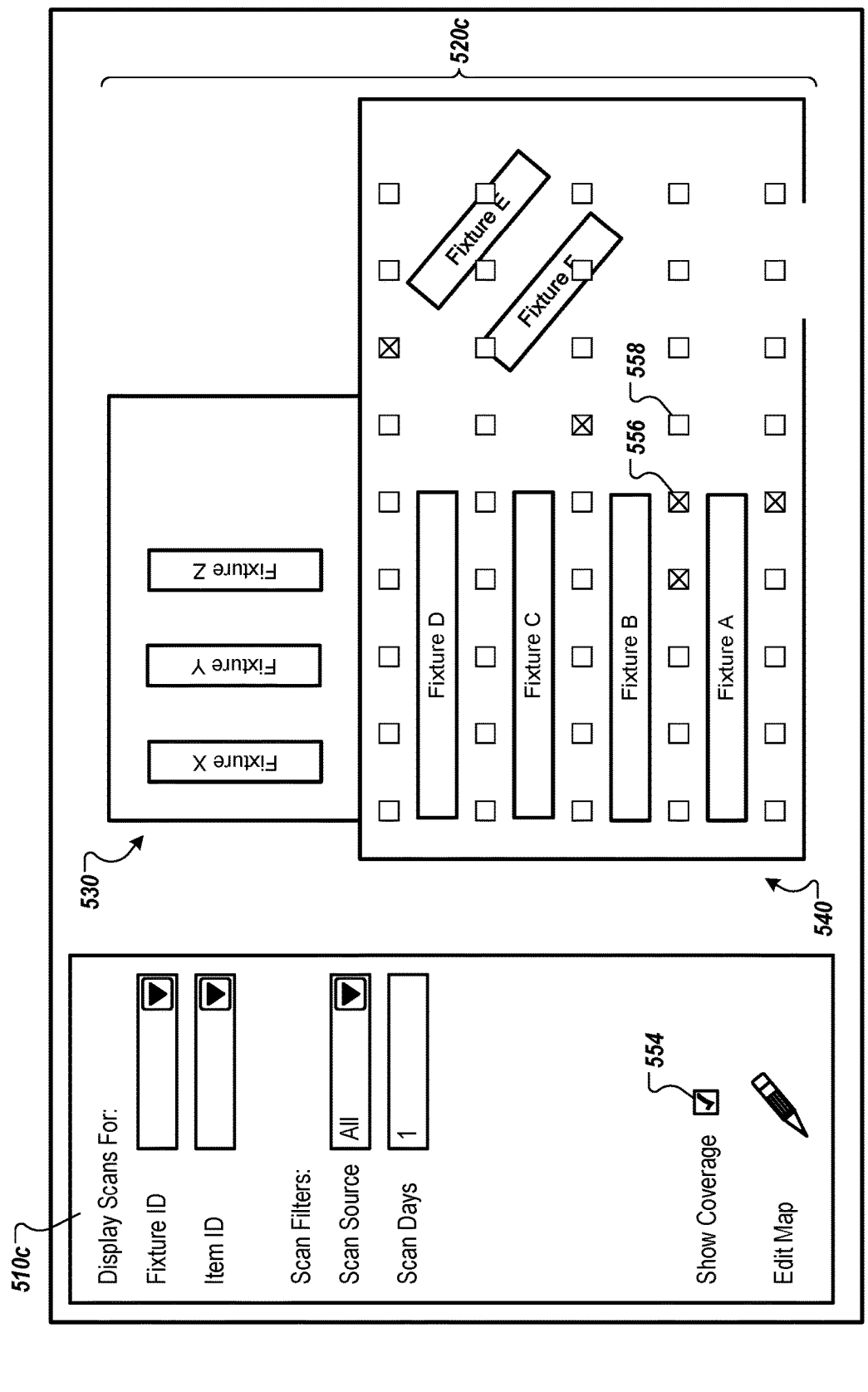

Referring now to FIG. 5C, for example, a coverage presentation control 554 of the interface 500c is shown for presenting, relative to the digital map 520c of the physical space, a coverage map that indicates, for each location determination device in a location determination system (e.g., the facility monitoring system 110), a working status of the location determination device. For example, the facility monitoring system 110 can monitor the working statuses of multiple different location determination devices (e.g., cameras, wireless beacons, wireless receivers, etc.) in the system 110, and can provide, for each location determination device, a position of the device in the physical space (e.g., according to an XY coordinate system), and a working status of the device (e.g., currently working or currently not working). In response to a user selection of the coverage presentation control 554, the digital map 520c can be updated to present an array of icons, each icon representing a different location determination device in the physical space. In the present example, no location determination devices are found to exists in the facility area 530 (e.g., the stockroom, a limited coverage area), however location determination devices are found to exist in the facility area 540 (e.g., the retail floor, a regular coverage area). As shown in the present example, most of the location determination devices are currently operating (e.g., as indicated by device representation icon 558), whereas some location determination devices are currently not operating (e.g., as indicated by device representation icon 556. Thus, in the present example, the interface 500c can be used to identify (and potentially correct) coverage issues in the physical space, and to identify possible discrepancies that may be linked to coverage issues.

Figure 5D:
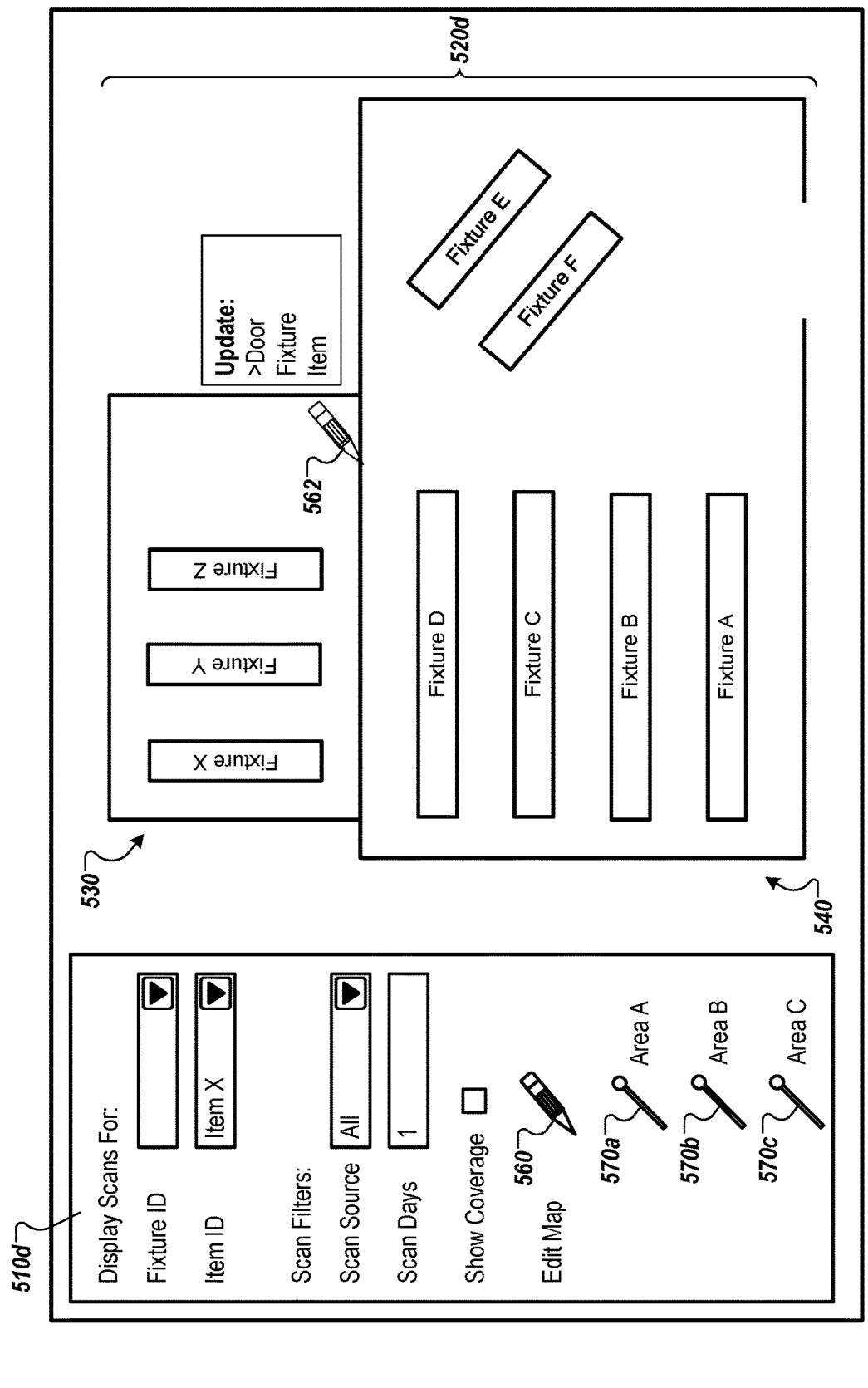

Referring now to FIG. 5D, for example, a map editing control 560 and various area identifier placement controls 570a-c of the interface 500d are shown for correcting map discrepancies and generating corrected map data. In general, a discrepancy indication can be received through the interface 500d that indicates a discrepancy location and a discrepancy type. For example, a user of the interface 500d can select the map editing control 560 and position a map discrepancy indication control 562 (e.g., by moving a cursor, by touching a display screen, or otherwise specifying map coordinates relative to the digital map 520d) to a location of the map of the physical space in which a discrepancy is present. The user can use the map discrepancy indication control 562 to indicate a type of discrepancy (e.g., a discrepancy of a map feature, a discrepancy of an item location, a discrepancy of a fixture label and/or fixture location, a discrepancy of a location of an area identifier, etc.). In the present example, a user of the interface 500d can indicate that a door is to be located in the digital map 520d, between the facility area 540 (e.g., the retail floor) and the facility area 530 (e.g., the stockroom).

In some implementations, a control for correcting map discrepancies can include a positionable identification placement control. For example, the interface 500d can be populated with various area identifier placement controls 570a-c, each area identifier placement control representing a different area in the digital map 520. Populating the interface 500d, for example, can include accessing an inventory system (not shown), retrieving area identifiers (e.g., stockroom labels, section labels, etc.) for a physical space that corresponds to the digital map 520, and generating a positionable control 570a-c for each area identifier. For area identifiers that have been previously linked to a position on the digital map 520, for example, a corresponding positionable control can be automatically placed at the position on the map. For area identifiers that have not been previously linked to a position on the digital map, for example, a corresponding positionable control that can be used to trigger corrections of identifier discrepancies (e.g., areas with missing identifiers) can be placed in the set of controls 510d. In the present example, a user of the interface 500d can select area identifier placement control 570a (e.g., "Area A"), and position the control 570a at facility area 530 (e.g., by moving a cursor, by touching a display screen, or otherwise specifying map coordinates relative to the digital map 520d). The area identifier that is associated with placement control 570a can then be linked with the position of facility area 530 on the digital map 520d when generating corrected map data, and the control 570a can be automatically placed at the linked position during subsequent presentations of the interface 500d.

In response to receiving the discrepancy indication, for example, corrected map data can be generated that corrects the discrepancy type at the discrepancy location. For example, the map maintenance system 160 (shown in FIG. 1A) can receive the discrepancy indication as discrepancy data 150, and can generate corrected map data 162 based on the discrepancy indication. Thus, in the present example, user-directed digital map corrections can be specified and integrated along with automatically applied digital map corrections (as described with respect to additional examples throughout this document). As another example, the interfaces 500a-d can be used to present indications of automatically detected map discrepancies, and the interfaces 500a-d can be used to manually investigate and apply appropriate map corrections.

Figure 6:
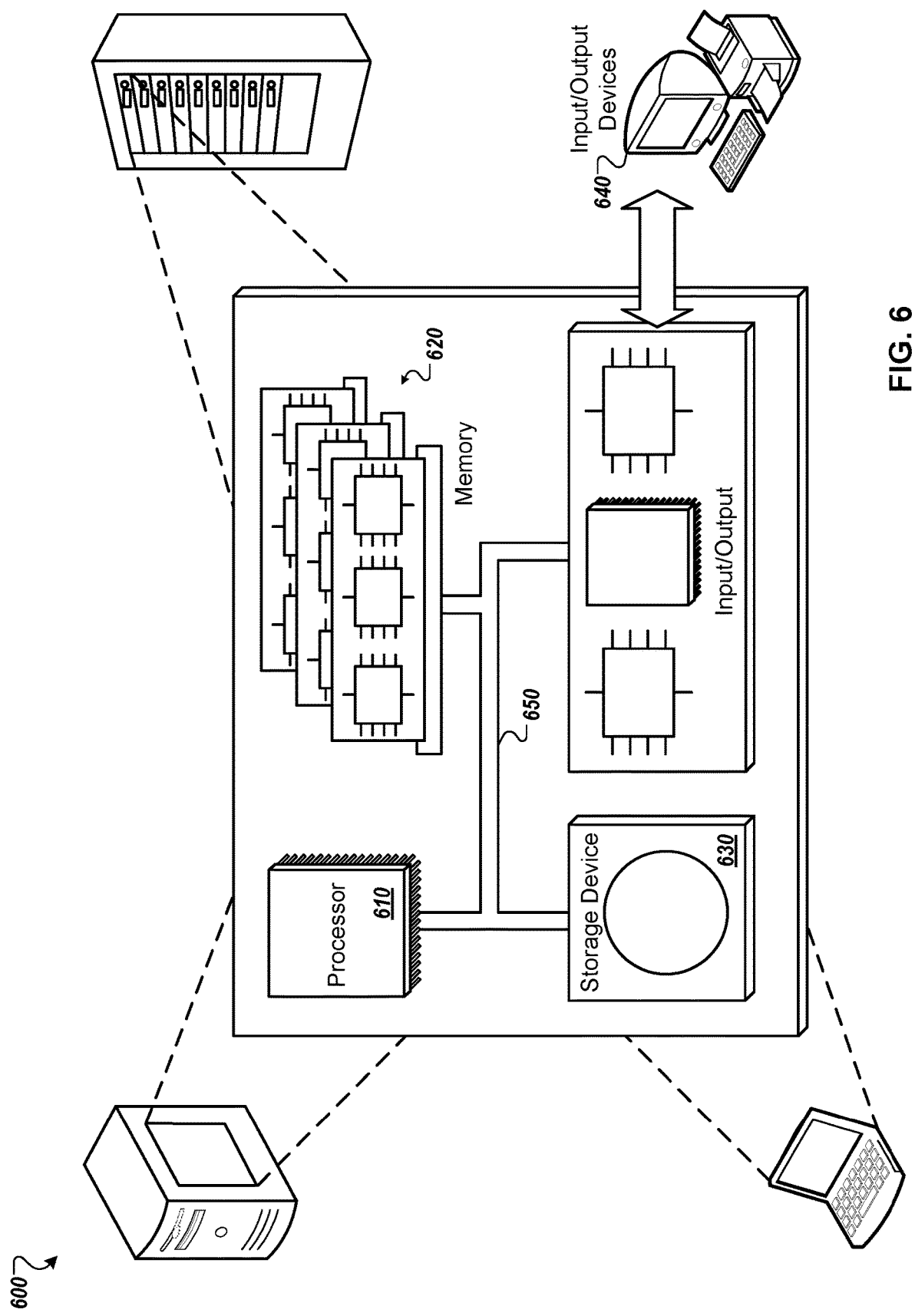
FIG. 6 is a schematic diagram that shows an example of a computing system.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computing system comprising:
   a plurality of mobile computing devices, each mobile computing device of the plurality of mobile computing devices including (i) one or more device location sensors configured to detect a current location of the mobile computing device in a facility, (ii) one or more item identification sensors configured to identify an item scanned by the mobile computing device, and (iii) one or more processors configured to execute a mobile device application that, when executed, performs operations comprising:
      performing a scan of an item in the facility; and
      after performing the scan of the item, transmitting, to a facility monitoring system, item location data including (i) an item identifier of the scanned item, (ii) a fixture identifier that uniquely identifies a fixture at which the scanned item was stored, and (iii) item location coordinates that indicate a location of the mobile computing device when the item was scanned;
   the facility monitoring system including (i) an array of location determination devices positioned throughout the facility, the array of location determination devices being configured to facilitate location determination operations of the plurality of mobile computing devices, and (ii) one or more processors, memory, and storage devices storing instructions that, when executed, cause the one or more processors of the facility monitoring system to perform operations comprising:
      receiving, from the plurality of mobile computing devices, item location data that corresponds to the performance of item scans; and
      transmitting the item location data to a map evaluation server; and
   the map evaluation server including one or more processors, memory, and storage devices storing instructions that, when executed, cause the one or more processors of the map evaluation server to perform operations comprising:
      receiving original map data for a digital map of the facility, wherein the original map data specifies the locations of fixtures in the facility, and specifies items stored at the fixtures, wherein a portion of the fixtures are in a limited coverage area of the facility in which location determination devices are currently non-operational or absent, and in which locations of mobile computing devices cannot be accurately determined;
      receiving, from the facility monitoring system, the item location data that represents the item scans that have been performed by the mobile devices in the facility;
      determining that a given item scan of a given item has occurred in the limited coverage area of the facility, by (i) determining that a given item location datum that represents the given item scan includes a given fixture identifier that corresponds to a given fixture that is located in the limited coverage area, and (ii) determining that the given item location datum includes item location coordinates that are within a threshold distance of an edge of a coverage area of the facility that is adjacent to the limited coverage area;

in response to determining that the given item scan of the given item has occurred in the limited coverage area, adjusting the item location coordinates of the given item location datum to be at a fixture that corresponds to the given fixture identifier and that is located in the limited coverage area;

determining that a discrepancy exists for the given fixture in the facility, based at least in part on a comparison of (i) the original map data and (ii) the adjusted item location coordinates of the given item;

in response to determining that the discrepancy exists, generating corrected map data that corrects the discrepancy for the given fixture; and providing a corrected digital map of the facility that replaces the original map data for the given fixture with the corrected map data for the given fixture.

2. The computing system of claim 1, wherein the corrected digital map is provided without updating the original map data.

3. The computing system of claim 1, the operations of the map evaluation server further comprising:

receiving item location data for item scans that occurred after the corrected map data was generated;

determining that the discrepancy still exits, or a different discrepancy exists for the given fixture in the facility;

in response to determining that the discrepancy still exists, or that the different discrepancy exists, (i) discarding previously generated corrected map data that corrects the discrepancy for the given fixture, and (ii) regenerating corrected map data that corrects the discrepancy or the different discrepancy; and providing another corrected map of the facility that replaces the original map data for the given fixture with the regenerated corrected map data for the given fixture.

4. The computing system of claim 1, wherein determining that the discrepancy exists for the given fixture in the facility includes (i) identifying an item that has been mapped to the given fixture according to the original map data, (ii) retrieving item location data that represents item scans for the item, and (iii) determining that a fixture identifier for the item from the item location data does not correspond to the fixture identifier for the item according to the original map data, and that item location coordinates for the item from the item location data correspond to a different fixture according to the original map data; and wherein generating the corrected map data that corrects the discrepancy for the given fixture includes generating corrected map data that specifies that the item is stored at the different fixture and is not stored at the given fixture.

5. The computing system of claim 1, wherein determining that the discrepancy exists for the given fixture in the facility includes (i) identifying an item that has been mapped to the given fixture according to the original map data, (ii) retrieving item location data that represents item scans for the item, and (iii) determining that a fixture identifier for the item from the item location data corresponds to the fixture identifier for the item according to the original map data, and that item location coordinates for the item from the item location data correspond to a different location in the physical space than specified in the original map data; and wherein generating the corrected map data that corrects the discrepancy for the given fixture includes generating corrected map data that specifies that the given fixture is located at the different location.

6. The computing system of claim 1, wherein determining that the discrepancy exists for the given fixture in the facility includes (i) identifying an item that has been mapped to the given fixture according to the original map data, (ii) retrieving item location data that represents item scans for the item, and (iii) determining that a fixture identifier for the item from the item location data does not correspond to the fixture identifier for the item according to the original map data, and that item location coordinates for the item from the item location data correspond to the given fixture according to the original map data; and wherein generating the corrected map data that corrects the discrepancy for the given fixture includes generating corrected map data that specifies that the fixture identifier for the given fixture is to be corrected as the fixture identifier from the item location data.

7. The computing system of claim 1, the operations further comprising:

presenting, by a map provision system and in a map interface, the digital map of the facility along with a coverage map that indicates, for each location determination device in the array of location determination devices, a working status of the location determination device.

8. The computing system of claim 1, the operations further comprising:

presenting, by a map provision system and in a map interface, the digital map of the facility;

receiving, by the map provision system and through the map interface, a discrepancy indication, wherein the discrepancy indication indicates a discrepancy location and a discrepancy type; and in response to receiving the discrepancy indication, generating, by the map evaluation server, corrected map data that corrects the discrepancy type at the discrepancy location.

9. The computing system of claim 1, wherein the fixture identifier of the fixture at which the scanned item was stored is scanned by the mobile computing device.

10. The computing system of claim 1, wherein the fixture identifier of the fixture at which the scanned item was stored is entered through an interface of the mobile device application of the mobile computing device.

11. The computing system of claim 1, wherein the location data that represents the location of the mobile computing device is represented according to a Cartesian coordinate system.

12. The computing system of claim 1, the operations of the facility monitoring system further comprising:

aggregating the item location data received from the plurality of mobile computing devices; and transmitting the aggregated item location data to the map evaluation server.

13. The computing system of claim 1, wherein the array of location determination devices includes one or more wireless beacons.

14. The computing system of claim 1, wherein the array of location determination devices includes one or more cameras.

\* \* \* \* \*